(No Model.)
E. GEORGE.
COTTON CHOPPER.
No. 585,747. Patented July 6, 1897.
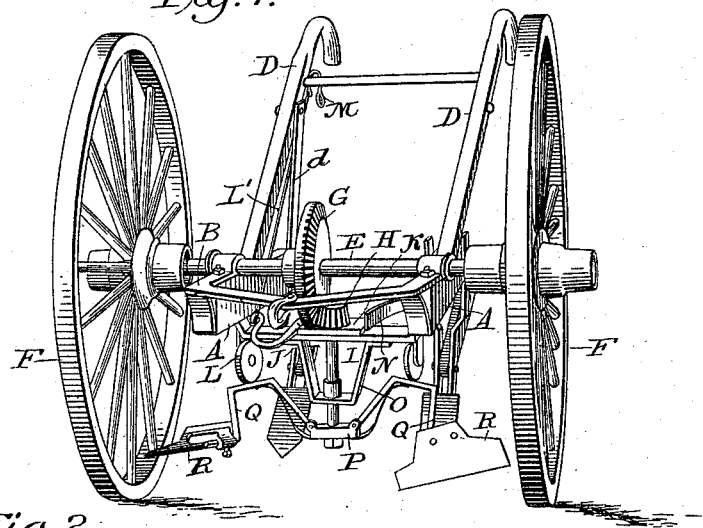
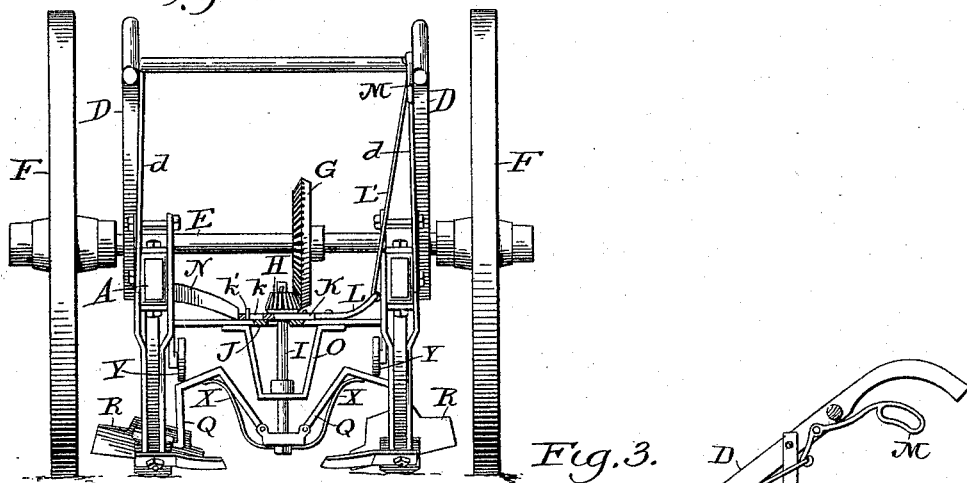
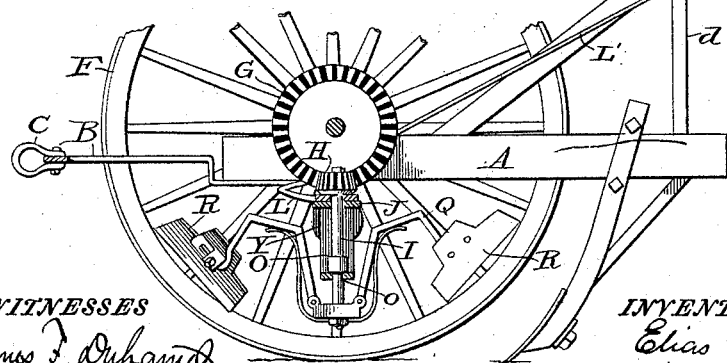
WITNESSES
James F. Duhamel
J. G. Tabler
INVENTOR
Elias George,
by John Wedderburn
Attorney

UNITED STATES PATENT OFFICE.

ELIAS GEORGE, OF CHERRY RIDGE, LOUISIANA.

COTTON-CHOPPER.

SPECIFICATION forming part of Letters Patent No. 585,747, dated July 6, 1897.

Application filed August 13, 1896. Serial No. 602,610. (No model.)

*To all whom it may concern:*

Be it known that I, ELIAS GEORGE, a citizen of the United States, residing at Cherry Ridge, in the parish of Union and State of Louisiana, have invented certain new and useful Improvements in Cotton - Choppers; and I do hereby declare the following to be a full, clear, and exact description of the invention, such as will enable others skilled in the art to which it appertains to make and use the same.

This invention relates to certain new and useful improvements in cotton choppers and cultivators; and it has for its objects, among others, to provide a simple and cheap construction by which more work can be accomplished in a given time and with better results. The hoes are adjustable in accordance with the distance between the rows, and the same may be thrown into or out of operative position by a lever arranged alongside one of the handles of the machine.

The device is composed of few parts, those readily assembled and not liable to get out of order.

Other objects and advantages of the invention will hereinafter appear, and the novel features thereof will be specifically defined by the appended claims.

The invention in this instance resides in the peculiar combinations and the construction, arrangement, and adaptation of parts, all as more fully hereinafter described, shown in the drawings, and then particularly pointed out in the claims.

The invention is clearly illustrated in the accompanying drawings, which, with the letters of reference marked thereon, form a part of this specification, and in which—

Figure 1 is a perspective view of my improved cotton chopper and cultivator. Fig. 2 is a rear view. Fig. 3 is a cross-section.

Like letters of reference indicate like parts throughout the several views.

Referring now to the details of the drawings by letter, A designates the side bars of the machine or frame, which are substantially parallel and connected by suitable cross-pieces and at the forward ends joined by the curved bar of iron B, to which the draft appliance or connection C is connected, as shown.

D are the handles, secured to the side bars in any suitable manner and braced by the braces *d*.

E is the axle, mounted in suitable boxes upon the upper faces of the side bars of the frame, and F are the wheels, which are preferably fluted on the tire or rim to prevent their slipping.

G is a bevel-pinion fast upon the axle near its mid-length, and it is preferably removably and adjustably supported on the axle by a collar and set-screw, as shown. This bevel-pinion meshes with a smaller bevel-pinion H on the spindle I. This pinion is secured to the spindle by groove and key, as shown, so as to allow of the raising and lowering of the spindle, which passes through a bar or plate J, bolted to the under side of the side bars, and this bar or plate has a slotted hole *j* in the center, through which the spindle works, and a sliding bar K is mounted on the plate J, with a hole in the center, through which the spindle passes, and this bar K has the slots *k*, through which pass the pins *k'*, held in the lower plate, and which serve, in connection with the said slots, as a guide for the sliding plate in its movements. This sliding plate is for the purpose of throwing the bevel-pinion H into or out of mesh with the pinion G, and for this purpose there is connected with the said sliding plate an arm L, to which is connected a cord or wire L', the other end of which is attached to the lever M, pivoted on one of the handles in such position that it may be grasped by the hand to move the sliding plate when desired.

N is a curved spring secured at one end to the side bar and its other end bearing against the end of the sliding plate to hold it in place.

O is a stirrup secured to the under side of the bar J and provided with a hole *o* in its center, through which the spindle works.

P is a hub secured to the lower end of the spindle by a set-screw, and extending from this hub are the arms Q, to which the hoes R are attached, the hoes each having a socket through which the outer ends of the arms or levers pass and upon which they are held by set-screws, so that they may be adjusted in or out, according to the size of the hills to be left. These levers are jointed, as shown, and springs X are arranged beneath the same and curved, as shown, so as to lift the levers, with the hoes attached thereto, entirely out of the ground except when otherwise acted upon. As the hoes rotate the levers pass under the wheels Y, which are adjustably and loosely mounted on spindles, as shown, and serve to regulate the depth of cut required through the said drill. These wheels overcome all friction and force the hoes to strike the drill at the desired point, and the curved springs beneath the levers raise the same clear from other obstructions, where each lever is held until it again comes in contact with one of the said wheels in its rotation and is then thrown down, ready to cut again.

What is claimed as new is—

1. The combination with the vertical spindle and the means for rotating the same, of the jointed levers, the hoes carried thereon, and the springs acting upon said levers to hold the hoes in their uppermost position, as set forth.

2. The combination with the spindle and the jointed levers carried thereby, of the hoes carried by the levers, the springs acting upon the under side of the levers, and the wheel mounted in the path traversed by said levers in their rotation, all substantially as and for the purpose specified.

3. The cotton chopper and cultivator described, consisting of the frame, the curved bar at the front end thereof, the bevel-pinion on the axle of the wheels, the spindle, the bevel-pinion on the same, the cross-bar, the sliding plate, the wire and lever for operating the same, the hoes, the spring acting on the sliding plate, and the plows at the rear ends of the side bars of the frame, all substantially as shown and described.

4. In a cotton-chopper, the combination with a rotary shaft, and spring-elevated arm hinged thereto and carrying a shovel, of a cam device for positively depressing the arm with its shovel when the shovel reaches it in its rotary movement.

5. In a cotton-chopper, the combination with a rotary shaft, and a pair of spring-elevated arms hinged thereto, said arms carrying shovels, of two rotatable devices located in the path of the arms as they revolve and adapted to depress said arms and cause the shovels at that time to be depressed.

6. In a cotton-chopper, the combination with the main shaft or axle having a bevel-pinion thereon, of a vertical shaft having shovels connected with its lower end and a bevel-pinion on its upper end, a spring-actuated slide-bearing in which the shaft revolves at or near its upper end and means within control of the driver, for swinging the vertical shaft in the opposite direction from that in which it is thrown by the spring.

7. In a cotton-chopper, the combination with a drive shaft or axle having a bevel-pinion thereon, of a vertical shaft having a bevel-pinion on one end and shovel on the other end, a slide bearing-box in which one end of this vertical shaft rotates, a spring for normally sliding the box in one direction so that the pinion on the vertical shaft is thrown out of mesh with the pinion on the main shaft or axle, and a lever pivoted to the frame of the machine in position to engage and slide the bearing-slide in a direction opposed to that in which the spring tends to slide it, and means within the reach of the driver for operating this lever.

In testimony whereof I have signed this specification in the presence of two subscribing witnesses.

ELIAS GEORGE.

Witnesses:
F. E. MAYO,
JAS. M. SMITH.